W. C. WEBSTER.
TRIPLE VALVE.
APPLICATION FILED JULY 10, 1913.
1,117,289.
Patented Nov. 17, 1914.
2 SHEETS—SHEET 1.
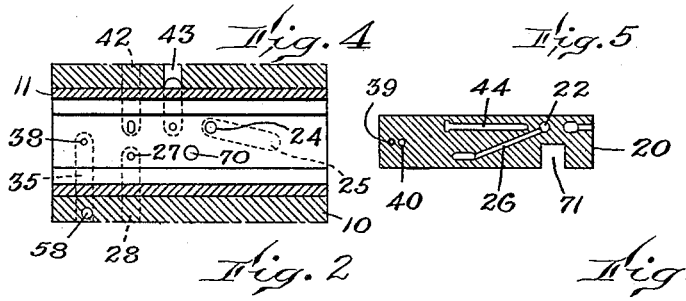
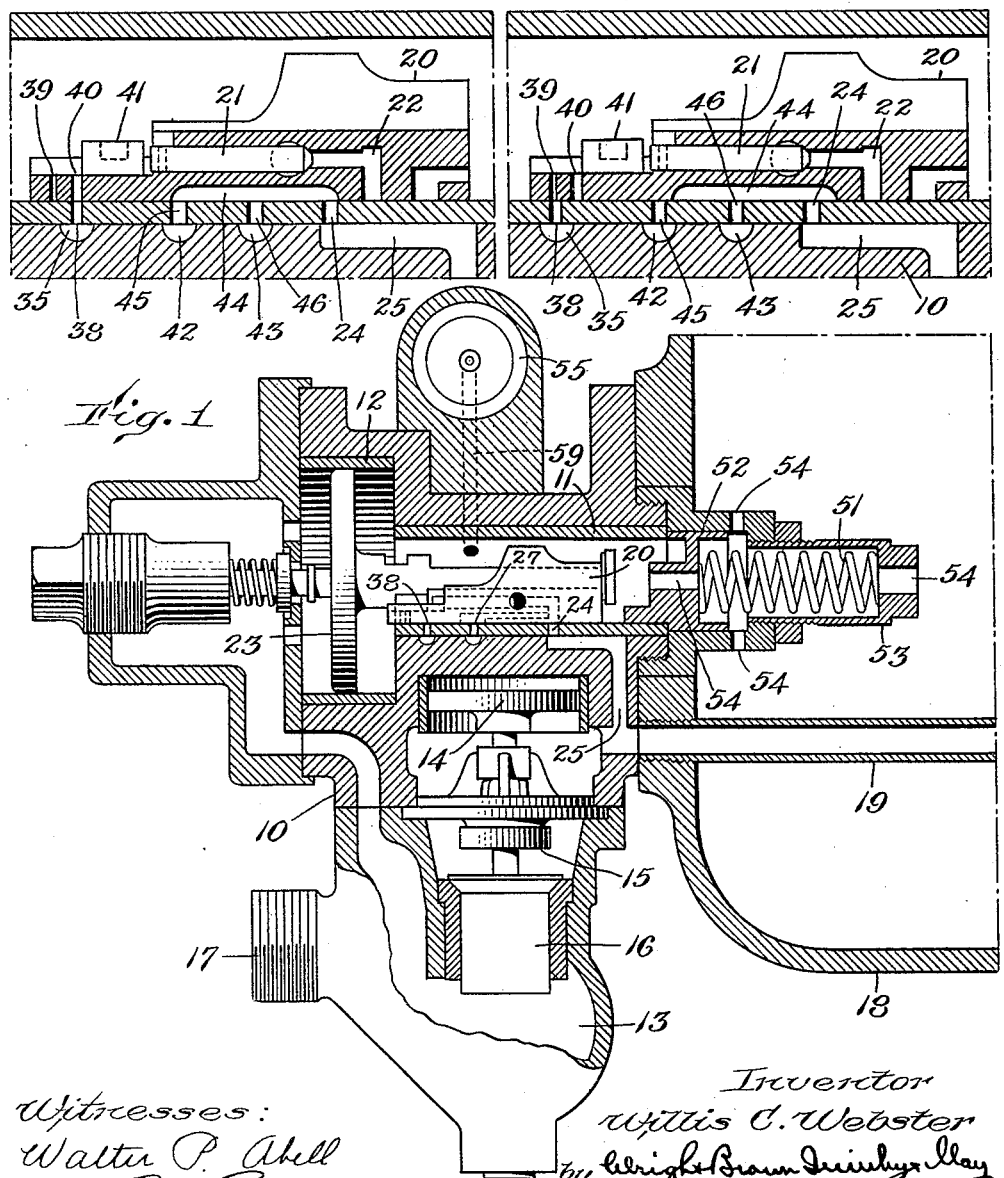
Witnesses:
Walter P. Abell
P. W. Pezzetti
Inventor
Willis C. Webster
by Wright Brown Quinby & May
Attorneys

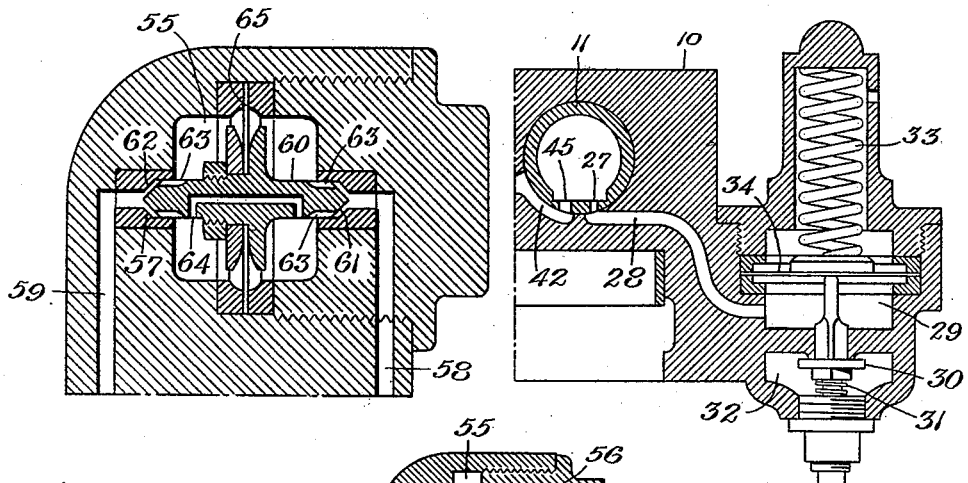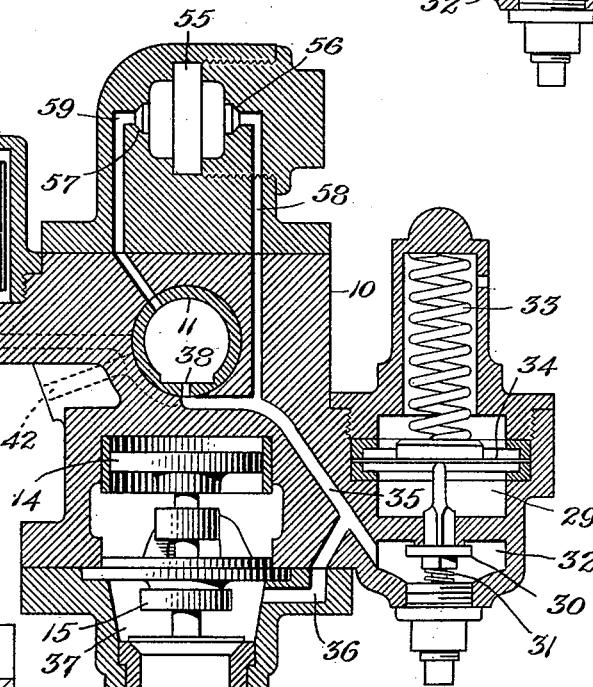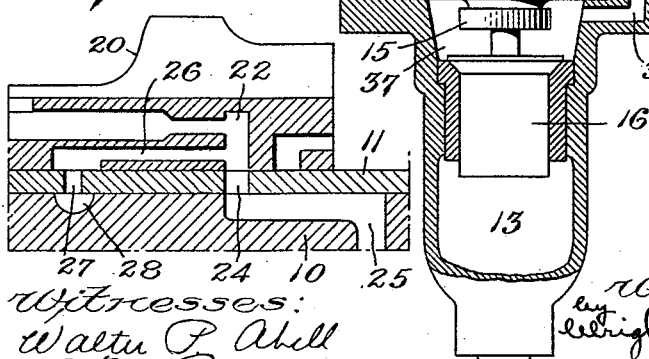

UNITED STATES PATENT OFFICE.

WILLIS C. WEBSTER, OF DUBOIS, PENNSYLVANIA, ASSIGNOR TO BUFFALO AIR BRAKE COMPANY, OF BUFFALO, NEW YORK, A CORPORATION OF ARIZONA.

TRIPLE VALVE.

1,117,289.   Specification of Letters Patent.   Patented Nov. 17, 1914.

Application filed July 10, 1913. Serial No. 778,304.

*To all whom it may concern:*

Be it known that I, WILLIS C. WEBSTER, a citizen of the United States, and resident of Dubois, in the county of Clearfield and State of Pennsylvania, have invented certain new and useful Improvements in Triple Valves, of which the following is a specification.

This invention relates to triple valves of fluid pressure brake apparatus.

The invention comprises, briefly described, a triple valve and a low pressure retaining valve which may be controlled by the triple valve as follows: Whenever the brakes have been set the triple valve is adapted to remain indefinitely in the service lap position and thereby maintain full pressure in the brake cylinder. From service lap position, the triple valve may be moved either to full release or running position as usual or to a position beyond running position to vent the brake cylinder through said retaining valve to hold the brakes applied with reduced pressure, and to recharge the auxiliary reservoir while the reduced brake cylinder pressure is held by the retaining valve. When the auxiliary reservoir has been recharged to the same pressure as the brake pipe pressure, the triple valve moves to full release position in consequence of equalizing the auxiliary reservoir pressure and brake pipe pressure. The movement to full release position causes a complete exhaust from the brake cylinder and fully releases the brake. The movement of the triple valve from service lap directly to full release position or to retaining valve position is optional with the engineer, a relatively slight increase of brake pipe pressure being effective for causing a full release of brakes without bringing into operation the retaining valve, while a relatively great increase of brake pipe pressure causes the triple valve to move to retaining valve position.

Another feature of the invention is an equalizing device which is adapted to perform the same functions as the usual leakage groove in the bushing of the triple valve piston, for maintaining equalization of the brake pipe pressure and of the auxiliary reservoir pressure. My improved equalizing device dispenses with the aforesaid leakage groove and is more effective, first, because it renders the triple valve more sensitive, and second, because it prevents the escape of auxiliary reservoir air back into the brake pipe when the brake pipe pressure is reduced below the auxiliary reservoir pressure. In consequence of substituting my improved equalizing device, the triple valve will respond more quickly and the brake apparatus will perform its functions as effectively with less initial pressure than is necessary with triple valves which have the leakage groove in the piston bushing.

Of the accompanying drawings, which illustrate the invention: Figure 1 represents a longitudinal section of a triple valve whose main piston and slide valve are in service position, this figure including a portion of an auxiliary reservoir and brake cylinder feed pipe. Fig. 2, on a larger scale, is a vertical section including a slide valve, its bushing, a graduating valve, and an adjacent portion of the valve casing. Fig. 3 is a section similar to Fig. 2, showing the slide valve in position to reduce but not exhaust the brake cylinder pressure. Fig. 4 represents a horizontal section including the slide valve bushing and adjacent portions of the main casing. Fig. 5 represents a horizontal section through the slide valve, near the bottom. Fig. 6 is a vertical cross section of the triple valve with its attachments. Fig. 7, on a larger scale, is a vertical section in the same plane as Fig. 6, showing valve mechanism which is omitted from Fig. 6. Fig. 8 is a vertical cross section through the brake cylinder supply valve shown at the right of Fig. 6,—Fig. 8 showing the brake cylinder supply passageway extending from the supply valve to the slide valve bushing. Fig. 9 is a longitudinal vertical section through the main slide valve and its bushing, showing the brake cylinder feed passages, the position of the slide valve being the same as in Fig. 1.

The same reference characters indicate the same parts wherever they occur.

The general structure and operation of the triple valve, except as otherwise specified, are standard, and reference is hereinafter made to U. S. Letters Patent 1,040,070, granted October 1, 1912, to Webster *et al.*, which patent shows a brake cylinder supply valve similar to the one included in Figs. 6 and 8 of this application.

The triple valve includes the usual main casing 10, slide valve bushing 11, main piston bushing 12, brake pipe chamber 13, and emergency equipment including piston 14, valve 15 and check valve 16. The casing of the chamber 13 is provided with a nipple 17 for connection with the usual brake pipe (not shown). The usual auxiliary reservoir is indicated at 18, and the brake cylinder feed pipe is indicated at 19.

A slide valve, indicated at 20, is provided with the usual graduating pin valve 21 and passageway 22 controlled thereby for conducting air from the auxiliary reservoir to the brake cylinder when the slide valve is in service position. The graduating valve is actuated, as usual, by a main piston 23. When the slide valve is in service position, as shown by Figs. 1 and 9, air passes from the auxiliary reservoir through passageway 22 and through brake cylinder feed port 24 of the slide valve bushing and thence through passageway 25 to the pipe 19. The slide valve includes a passageway 26 by which air is conducted directly from the brake pipe to the brake cylinder for general service application. This passageway 26 is smaller than that which conducts air from the auxiliary reservoir to the brake cylinder. In this respect the slide valve is similar to that shown in the aforesaid patent to Webster et al., 1,040,070. As shown by Fig. 9, the delivery end of passageway 26 communicates with passageway 22. The receiving end of passageway 26 registers with a port 27 in the bushing 11. This port is at the delivery end of a feed passageway 28 (see Fig. 8), the receiving end of said passageway communicating with a chamber 29 of a brake cylinder supply valve 30. This valve is closed by a spring 31 and by pressure in chamber 32, and is opened by a spring 33. The stem of the valve 30 engages the under side of a diaphragm 34, which diaphragm is disposed to be depressed by the spring 33. The spring 33 tends to hold the valve 30 in open position; but when the air pressure in the chamber 29 exceeds the degree for which the spring 33 is adjusted, this pressure, acting upon diaphragm 34, compresses the spring 33 and permits the valve 30 to close,—all as set forth in said Patent 1,040,070. The chamber 32 is at one end of a passageway 35 (see Fig. 6). This passageway receives air from a passageway 36 whose receiving end is in the chamber 37 which contains the emergency valve 15. The passageway 36 is on the brake cylinder side of the check valve 16. When the slide valve is in service position, air from the brake pipe passes through chamber 13, past check valve 16, through passageways 36 and 35, to valve chamber 32, past valve 30 to chamber 29, through passageway 28 and port 27, passageway 26 in the main slide valve, passageway 22, port 24, passageway 25, and brake cylinder pipe 19. Pressure cannot escape back into the brake pipe from the brake cylinder because of the check valve 16.

The auxiliary reservoir is recharged by means of the passageway 35. As shown by Figs. 4 and 6, one end of this passageway registers with a port 38 in the slide valve bushing. This port is hereinafter termed the recharging port. It is disposed to be closed by the slide valve 20 when the latter is in all positions except full release position and one other position which I call "semi-release" position. The slide valve is shown in full release or running position by Fig. 2, and in semi-release position by Fig. 3. My reason for using the phrase "semi-release" is that the brakes are only partly released when the slide valve is in this position, a full release of the brakes being possible only when the slide valve is in the position shown by Fig. 2. The operation by which the brakes are partially released is hereinafter explained.

The slide valve 20 has two recharging ports which are indicated respectively at 39 and 40, and it carries an auxiliary slide valve 41 which for the sake of avoiding confusion I call a "cut-off" valve. The function of the valve 41 is to cut off communication between the auxiliary reservoir and the recharging passageway 35 upon the first movement of the main piston 23 from running position to service position to prevent leakage from the auxiliary reservoir back into the brake pipe should the check valve 16 for any reason be defective or held open by a particle of dirt. The valve 41 is connected to the stem of the main piston and is moved to the left from the position shown by Fig. 2 as soon as the main piston begins to move, thus cutting off communication between the auxiliary reservoir and passageway 35 before the piston has picked up the slide valve 20.

The triple valve is provided with two exhaust passageways, one of which, indicated at 42, I call the main exhaust, and the other, indicated at 43, I call the semi-exhaust. As shown by Fig. 2, air from the brake cylinder may pass through passageway 25, port 24, exhaust cavity 44 in the bottom of the slide valve 20, exhaust port 45, and the main exhaust passageway 42 to the atmosphere. (See Fig. 6.) Air can escape at the same time through port 46 into the semi-exhaust passageway 43. This passageway (see Fig. 6) delivers the air into a valve chamber 47 which contains an automatic low pressure retaining valve 48 of well-known construction.

The terms "automatic low-pressure retaining valve" and "retaining valve" are synonymous as used in this specification and in the claims, and it is to be understood that the meaning of said terms in every instance is a valve which will retain only a predetermined pressure and permit the escape of all pressure above such predetermined pressure.

This valve is provided with a weight 49 by which it is normally held seated against the delivery end of the passageway 43. If the pressure of air is sufficient to lift the valve 48, the air passes into the chamber 47 from which it may escape to the atmosphere through outlets 50, 50. The weight 49 closes the valve 48 before the pressure in the brake cylinder is reduced to that of the atmosphere, the brake cylinder pressure being thereafter fully exhausted by the main exhaust 42 alone. The chief utility of the retaining valve 48 is, however, to hold the brakes applied at relatively low pressure while the auxiliary reservoir is being recharged with the slide valve 20 in the position shown by Fig. 3. In this position the main exhaust port 45 is closed, and the only escape is through the semi-exhaust 43 and retaining valve 48. The slide valve is moved to this position by a very sudden and relatively great increase of brake pipe pressure above the auxiliary reservoir pressure while the brakes are applied. This great excess of brake pipe pressure, acting upon the main piston 23, moves the slide valve past full release position and causes the slide valve to compress a spring 51. (See Fig. 1.) This spring is compressed between a sliding block 52 and an adjustable bonnet 53. The block 52 is normally held against the right-hand end of the bushing 11 with a pressure which may be regulated by adjusting the bonnet 53 to vary the pressure of the spring. Air passageways 54 are formed in the block 52, its support, and bonnet 53, to conduct the air to and from the auxiliary reservoir. When the valve 20 is in full release or running position, its right-hand end merely touches the block 52, the latter remaining in the position shown; but when after a brake application the brake pipe pressure is raised more than enough to give a full release, the piston 23 and the valve 20 have an overtravel past running position to the position shown by Fig. 3, thereby displacing the block 52 to the right and compressing the spring 51. As this cuts off the main exhaust 42, the air in the brake cylinder can escape only through the semi-exhaust which is controlled by the retaining valve 48. This valve, as previously stated, does not permit a full release of the brakes but permits only a semi-release, and holds the brakes at reduced pressure until the slide valve 20 is returned to full release position by the spring 51. Such return cannot occur until the auxiliary reservoir pressure has been raised to such a point that it in conjunction with the spring 51 is sufficient to predominate over the brake pipe pressure acting upon the left-hand side of the piston 23. The pressure on both sides of the piston 23 is equalized by the recharging port 39 of the slide valve 20. As shown by Fig. 3, this recharging port 39 registers with the recharging port 38 in the bushing when the slide valve is in semi-release position. It will be observed that the port 39 is relatively small and for this reason the equalizing operation and reduced brake application are prolonged.

As previously stated, the slide valve 20 is returned to full release or running position when the auxiliary reservoir is recharged sufficiently by the recharging port 39. As soon as the valve 20 is placed in full release position, the reduced pressure in the brake cylinder escapes through the main exhaust 42, and the valve remains in this position until the next reduction of brake pipe pressure. The main exhaust 42 is, of course, momentarily open while the slide valve 20 is moving from service position to semi-release position. This momentary opening of the main exhaust is an advantage in that it hastens the reduction of brake cylinder pressure to the reduced pressure desired. The pressure which is retained by the valve 48 depends, of course, upon the size of the weight 49. For ordinary purposes this weight would preferably be of a size sufficient to retain from fifteen to twenty pounds pressure in the brake cylinder, but could obviously be made to retain a greater pressure or to release the pressure to a lower point. It has now been shown how the semi-exhaust 43 hastens full release of the brakes and how the main exhaust 42 hastens the reduction of pressure to a semi-release.

Figs. 6 and 7 show a device for equalizing auxiliary reservoir pressure and brake pipe pressure when the triple valve is in running position and in service lap position. This device dispenses with, and performs the same function as, the leakage groove usually formed in the bushing 12 of the piston 23. My device for this purpose, however, is far more efficient than the well-known leakage groove, because there is not so much friction as attends the operation of the main piston, and it responds more readily to variations of pressure and saves the auxiliary reservoir pressure which has hitherto been lost through the leakage groove of the piston bushing. The saving of auxiliary reservoir pressure causes the triple valve to act more promptly when a service reduction is made. Referring first to Fig. 6, an equalizing valve chamber is indicated at 55. This chamber contains two valve seats, indicated respectively at 56 and 57. A passageway 58 forms communication between the passageway 35 and one end of the chamber 55, while a passageway 59 forms communication between the other end of the chamber and the auxiliary reservoir through the slide valve bushing 11. The opening into the slide valve bushing is above the slide valve and is always open. The valve mechanism which occupies the chamber 55 is shown by Fig. 7, but is omitted from Fig. 6 because the scale of the latter figure is too much reduced. As shown by Fig. 7, the valve mechanism comprises a plunger 60 which has a valve 61 at one end and a valve 62 at the opposite end. These valves coöperate respectively with the seats 56 and 57. The valves are open as shown by Fig. 7, the plunger 60 being in a neutral position midway between the valve seats. The plunger is provided with equalizing grooves 63 and with an equalizing passageway 64 whereby the brake pipe pressure may sustain the pressure in the auxiliary reservoir and compensate for slight leakage from the latter. The equalizing chamber 55 is divided by diaphragm 65, the plunger 60 being suitably connected to the diaphragm so as to be actuated in one direction or the other according to a greater air pressure on one side or the other. The engineer's feed valve, of course, supplies the entire brake system with air to compensate for slight leaks while the triple valves are in full release or running position, this supply passing to the auxiliary reservoirs of the several cars through the passageways 36, 35, recharging ports 38, and likewise through the equalizing passageway 64 and grooves 63. Whenever the brake pipe pressure is reduced sufficiently to effect an application of the brakes, the predominating pressure in the auxiliary reservoir acting upon the right-hand side of the piston 23 causes the triple valve to operate as usual.

The operations attending a service application are in accordance with standard practice, as follows:—auxiliary reservoir air escapes into the brake cylinder so long as the triple valve remains in service position, and when the auxiliary reservoir pressure has dropped slightly below the reduced brake pipe pressure the latter moves the triple piston and graduating pin valve to service lap position. The control of the auxiliary reservoir air is, however, different from that in the standard triple valve, in that no air is permitted to flow from the auxiliary reservoir to the brake pipe when the service reduction occurs. For this and other reasons a normal running pressure of fifty pounds is as effective as a normal running pressure of sixty pounds with triple valves which have a leakage groove in the piston bushing. Assuming, for the sake of illustration but without any idea of limiting my invention, that fifty pounds is the normal running pressure and that reducing the brake pipe pressure to forty-five pounds is sufficient for applying the brakes, and assuming also that the brake cylinder supply valve 30 closes when the pressure against the diaphragm 34 is at forty pounds, the following conditions occur when the triple valve is operated. Starting with the valve in running position with the pressure at fifty pounds, the first change is a drop of brake pipe pressure to forty-five pounds. The emergency check valve 16 prevents a drop of pressure between it and the auxiliary reservoir, and consequently no air can escape from the auxiliary reservoir into the brake pipe. Incidentally the diaphragm 65 remains balanced, unless, of course, the check valve 16 leaks. In the event of a leak past the check valve, the pressure on the right-hand side of the diaphragm 65 will drop, and the valve 61 will thereupon be closed and prevent the loss of pressure from the auxiliary reservoir at this point. Such closing of the valve 61 will occur, if at all, before the slide valve 20 is moved, because the equalizing valve is so sensitive that it will be operated by a variation of five or six ounces of pressure, whereas a variation of three or four pounds pressure is necessary to move the slide valve. The triple valve will then move to service position as usual and enable fluid pressure to pass from the auxiliary reservoir into the brake cylinder and also pass directly from the brake pipe through the reducing valve and passageway 26, into the brake cylinder,—all as set forth in said Patent 1,040,070. The equalizing passageway 64 and the grooves 63 are so limited in their capacity that a few ounces difference in pressure on either side of the diaphragm 65 will close the valve on the low-pressure side; and although the pressure in every case will eventually equalize through said port and grooves, the very limited capacity of the port and grooves retards the equalizing operation. The capacity of these equalizing passageways is only enough to compensate for unavoidable leakage from the auxiliary reservoir when the triple valve is in running position. So long as the pressures are equal, or nearly so, the device stands in its normal position with both valves open, as shown by Fig. 7.

If the brake pipe pressure be increased beyond the capacity of the equalizing grooves 63 and passageway 64, the valve 62 will be closed and thus cut off all communication between the brake pipe and the auxiliary reservoir. Inasmuch as five or six ounces excess pressure in the brake pipe will cause the closing of the valve 62, no appreciable quantity of fluid pressure can pass from the brake pipe into the auxiliary reservoir until the slide valve is moved to one of its two recharging positions shown by Figs. 2 and 3. The main piston 23 receives the full benefit of the increased brake pipe pressure after the valve 62 is closed; and for this reason the action of the triple valve in moving from service or service lap position to either recharging position is easily and quickly effected. If it is desired to effect a full release of the brakes at once, the brake pipe pressure would be increased only enough to move the slide valve to the position shown by Fig. 2. On the other hand, if it should be desired to hold the brakes applied at reduced pressure by the retaining valve before effecting a full release, the brake pipe pressure would be increased to a greater extent so as to cause the slide valve to move to the position shown by Fig. 3. The slide valve 20 would remain in semi-release position until the auxiliary reservoir were recharged through the port 39. The slide valve would then move to full release or running position, but under no circumstances could the slide valve be shifted from semi-release to full release position without first recharging the auxiliary reservoir to the same pressure as that in the brake pipe.

The operations hereinbefore described would not affect the standard, well-known operation of the emergency valve 15. Fig. 4 shows a port 70 in the bushing 11 for conducting air from the auxiliary reservoir to the emergency piston 14, and Fig. 5 shows a cavity 71 in the slide valve 20 for uncovering the port 70 when the slide valve is moved to emergency position.

I am well aware that retaining valves have been used for the purpose of holding the brakes applied at relatively low pressure; but I believe I am the first to provide means for automatically effecting a full release of the brakes after the brakes have been held applied at low pressure by a retaining valve. It has been necessary hitherto for trainmen to operate hand valves in order to fully release the brakes which have been held applied by retaining valves. As a result of combining a retaining valve with a triple valve and providing connections whereby the slide valve is adapted to cause a full release of the brakes after the retaining valve has been used, the engineer of a train comprising a large number of cars (freight cars, for example) is enabled to release the brakes of the rear cars before the brakes of the forward cars are released. For example, if a train comprises forty cars and the brakes are held applied while the triple valves are in service lap position, the engineer, wishing to release the brakes on the rear cars first, does so by admitting a great volume of compressed air from the main reservoir into the brake pipe. The triple valves of the forward cars are influenced to a greater extent than the triple valves of the rear cars, because they are nearer the source of supply. The triple valves of the forward cars—the first twenty cars, for example—will therefore receive excessive pressure which will shift them to semi-release position (Fig. 3), the valves of the several cars acting successively. As each slide valve comes to recharging position, some of the air passes from the brake pipe into the auxiliary reservoir, and by the time the increased brake pipe pressure has acted upon about twenty triple valves its excess is so much reduced that thereafter it will move the remaining triple valves only to full release position. The brakes of the rear cars will thereupon be fully released without any utilization of their retaining valves 48. This operation avoids a common cause of breaking a train in two when the engineer opens the throttle before all the brakes have been released; and I believe I am the first to have provided releasing mechanism whereby the brakes on the forward cars will be held applied until those on the rear cars have been released. If the engineer raises the brake pipe pressure only so much as to move the triple valves at the front end of the train to full release position, the brakes will be released at the front end of the train first, regardless of whether the train is long or short.

I claim:

1. In a fluid pressure brake apparatus, a triple valve, and an automatic low-pressure retaining valve arranged to coact with the brake cylinder through said triple valve, said triple valve having means arranged to simultaneously vent said brake cylinder through said retaining valve and form recharging communication between the brake pipe and auxiliary reservoir when out of running position.

2. In a fluid pressure brake apparatus, a triple valve, an automatic low-pressure retaining valve arranged to coact with the brake cylinder through said triple valve, said triple valve having means arranged to simultaneously vent said brake cylinder through said retaining valve and form recharging communication between the brake pipe and auxiliary reservoir when out of running position, and means arranged to vent said brake cylinder independently of said retaining valve when the triple valve is in running position.

3. In a fluid pressure brake apparatus, a brake pipe and a pressure retaining valve adapted to coact with an auxiliary reservoir and brake cylinder, and a triple valve comprising a slide valve and passageways controlled by said slide valve for forming communication from said brake cylinder to the atmosphere through said retaining valve when the brake pipe pressure is above the auxiliary reservoir pressure, and a passageway controlled by said slide valve for forming other communication from said brake cylinder to the atmosphere when the auxiliary reservoir pressure and brake pipe pressure are equal.

4. In a fluid pressure brake apparatus, a brake pipe and an automatic low-pressure retaining valve arranged to coact with an auxiliary reservoir and brake cylinder respectively, and a triple valve comprising a slide valve, and having passageways controlled by said slide valve for venting said brake cylinder through said retaining valve when the brake pipe pressure is above the auxiliary reservoir pressure, a passageway controlled by said slide valve for forming communication between said brake pipe and auxiliary reservoir while said slide valve is adjusted to vent said brake cylinder through said retaining valve as aforesaid, and means controlled by said triple valve to vent said brake cylinder to the atmosphere independently of said retaining valve.

5. In a fluid pressure brake apparatus, the combination with a triple valve arranged to coact with a brake pipe, brake cylinder and auxiliary reservoir, of an automatic low-pressure retaining valve and a passageway leading thereto from the slide valve seat of the triple valve, said triple valve having an exhaust passageway leading directly to the atmosphere from a port in said seat, said slide valve having means for venting said brake cylinder through said retaining valve passageway and retaining valve when the brake pipe pressure is above auxiliary reservoir pressure and for venting said brake cylinder through exhaust passageway when the auxiliary reservoir pressure is built up to the brake pipe pressure.

6. In a fluid pressure brake apparatus, a brake pipe and an automatic low-pressure retaining valve arranged to coact respectively with an auxiliary reservoir and a brake cylinder, and a triple valve including a main piston movable in both directions from running position, and a valve structure operable by said piston for forming communication between said auxiliary reservoir and brake cylinder when said piston is at one side of said running position and for venting said brake cylinder through said retaining valve when said piston is at the opposite side of said running position.

7. A triple valve for fluid pressure brakes, comprising a main piston and slide valve operated thereby, the seat for said slide valve having a brake cylinder port, an exhaust port, and a third port, all arranged to be controlled by said slide valve, an automatic low-pressure retaining valve and passageway leading thereto from said third port, said slide valve having means arranged to vent said brake cylinder through said exhaust port when in running position, and to close said exhaust port and vent said brake cylinder through said third port and retaining valve when behind said running position.

8. A triple valve for fluid pressure brakes, comprising a main piston and slide valve operated thereby, the seat for said slide valve having a brake cylinder port, an exhaust port, and an intermediate port, and an automatic low-pressure retaining valve arranged to coact with said brake cylinder through said intermediate port, said slide valve being formed to make communication between said brake cylinder port and exhaust port when in running position and to close said communication and vent said brake cylinder through said brake cylinder port, intermediate port, and said low-pressure retaining valve when said slide valve is moved beyond said running position by superior pressure on the brake pipe side of said piston.

9. A triple valve for fluid pressure brake apparatus including an auxiliary reservoir, said valve comprising a main piston and slide valve operated thereby, the seat for said slide valve having a brake cylinder port and an exhaust port and said slide valve being adapted to form communication between said ports when in running position, said slide valve being movable in two directions from running position and adapted to close said communication in any other position, said slide valve seat having a retaining valve port arranged to be controlled by said slide valve and to be in communication with said brake cylinder port when the slide valve is moved past running position by excess pressure on the brake pipe side of said piston, a low pressure retaining valve and passageway leading thereto from said retaining valve port, and yielding means for coacting with the auxiliary reservoir pressure to move the slide valve to running position.

10. A triple valve for fluid pressure brake apparatus including an auxiliary reservoir, said valve comprising a main piston and slide valve operated thereby, and a yielding abutment for determining the running position of said piston and slide valve, said abutment being arranged to be displaced by movement of the piston and slide valve beyond running position in the direction away from service position, said abutment being adapted to coact with the auxiliary reservoir pressure to move the piston and slide valve back to running position, the seat for said slide valve having a brake cylinder port, an exhaust port, and a retaining valve port all controlled by said slide valve, and an automatic low pressure retaining valve and passageway leading thereto from said retaining valve port, said slide valve being adapted to form communication from said brake cylinder port to said exhaust port when in running position and to close such communication and vent said brake cylinder through said brake cylinder port, said retaining valve port and said retaining valve when beyond running position toward said abutment.

11. In a fluid pressure brake apparatus, an automatic low-pressure retaining valve arranged to coact with the brake cylinder, and a triple valve including a main piston and valve mechanism operable by said piston, said valve mechanism being adapted to vent said brake cylinder through said retaining valve when in another position than service lap position, said valve mechanism being adapted to vent said brake cylinder independently of said retaining valve when between the two aforesaid positions.

12. In a fluid pressure brake apparatus, an automatic low-pressure retaining valve arranged to coact with the brake cylinder, and a triple valve having a slide valve, a seat for said slide valve, a passageway from said seat to said brake cylinder, a passageway from said seat to said retaining valve, and an exhaust passageway independent of said retaining valve from said seat to the atmosphere, said slide valve being adapted when in running position to form communication between said three passageways and in another position to close said exhaust passageway and maintain communication between the two other said passageways.

13. In combination, a triple valve adapted to coact with a brake pipe, brake cylinder and auxiliary reservoir of a fluid pressure brake apparatus, and an automatic low-pressure retaining valve arranged to coact with said brake cylinder through said triple valve, said triple valve having means arranged to completely vent said brake cylinder and recharge the auxiliary reservoir when in running position, and to vent said brake cylinder to a predetermined pressure through said retaining valve and recharge said auxiliary reservoir when in another position.

14. A triple valve for coacting with the brake cylinder of a fluid pressure brake apparatus, and an automatic low-pressure retaining valve arranged to coact with said brake cylinder through said triple valve, said triple valve comprising a main piston and means operable by said piston for venting said brake cylinder through said retaining valve, said triple valve having an exhaust port independent of said retaining valve arranged to be put into communication with said brake cylinder through said means when said retaining valve is in communication with said brake cylinder for venting as aforesaid, said means being adapted in one position to close communication between said brake cylinder and exhaust port while maintaining said venting communication through said retaining valve.

15. In a fluid pressure brake apparatus, a triple valve arranged to coact with the brake cylinder, and an automatic low-pressure retaining valve arranged to coact with said brake cylinder through said triple valve, said triple valve comprising a main piston and valve mechanism operable thereby, said triple valve having a passageway leading from said valve mechanism to said brake cylinder, a passageway leading from said valve mechanism to said retaining valve, and an exhaust passageway independent of said retaining valve, said valve mechanism when in service lap position closing said retaining valve passageway and said exhaust passageway, and when in running position forming communication between said three passageways, said piston and valve mechanism being capable of over-travel beyond running position to a third position in consequence of superior pressure on the brake pipe side of said piston, said valve mechanism being adapted in said third position to close said exhaust passageway and vent said brake cylinder through said retaining valve passageway.

16. In combination, a triple valve and an automatic low-pressure retaining valve in communication therewith for coacting with the brake cylinder of a fluid pressure brake apparatus, said triple valve having an exhaust port, a brake cylinder port, a port leading to said retaining valve, and valve mechanism adapted in one position to make communication from said brake cylinder port to said retaining valve port exclusively, and in another position to make communication between all said ports at once.

17. The combination of an automatic low-pressure retaining valve with a tripple valve adapted to coact with a brake pipe, auxiliary reservoir and brake cylinder of a fluid pressure brake apparatus, said tripple valve comprising a piston and means operable thereby whose traverse in one direction from running position admits fluid pressure into said brake cylinder, and whose traverse in the opposite direction from running position vents said brake cylinder through said retaining valve.

18. In a fluid pressure brake apparatus, a triple valve whose pressure-operated parts are movable to both sides of the running position, and an automatic low-pressure retaining valve arranged to coact with the brake cylinder through said triple valve, said triple valve having passageways controlled by said pressure-operated parts to charge said brake cylinder when said parts are at one side of said running position, and a passageway controlled by said pressure-operated parts to vent said brake cylinder through said retaining valve when said parts are at the opposite side of said running position.

19. In a fluid pressure brake apparatus, a triple valve whose pressure-operated parts are movable to both sides of the running position, and an automatic low-pressure retaining valve arranged to coact with the brake cylinder through said triple valve, said triple valve having passageways controlled by said pressure-operated parts to charge said brake cylinder when said parts are at one side of said running position, and ports controlled by said pressure-operated parts to vent said brake cylinder through said retaining valve and recharge the auxiliary reservoir when said parts are at the opposite sides of said running position.

20. In a fluid pressure brake apparatus, a triple valve, and an automatic low-pressure retaining valve arranged to coact with the brake cylinder through the slide valve of said triple valve, said slide valve having ports arranged to simultaneously vent said brake cylinder through said retaining valve and recharge the auxiliary reservoir when out of running position.

21. In a fluid pressure brake apparatus, a triple valve, and an automatic low-pressure retaining valve arranged to coact with the brake cylinder through the slide valve of said triple valve, said triple valve having ports controlled by said slide valve to recharge the auxiliary reservoir and vent said brake cylinder to atmospheric pressure when said triple valve is in running position, and ports controlled by said slide valve to recharge said auxiliary reservoir and vent said brake cylinder through said retaining valve when in another position.

In testimony whereof I have affixed my signature, in presence of two witnesses.

WILLIS C. WEBSTER.

Witnesses:
U. S. N. CROUSE,
JAMES M. BRYAN.